United States Patent
Nakayama et al.

(10) Patent No.: US 6,515,872 B2
(45) Date of Patent: Feb. 4, 2003

(54) AUTOMOBILE AND ELECTRIC POWER SYSTEM CONTROLLER THEREOF

(75) Inventors: Hiroshi Nakayama, Toyota (JP); Koichi Mizutani, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 9 days.

(21) Appl. No.: 09/986,717

(22) Filed: Nov. 9, 2001

(65) Prior Publication Data
US 2002/0057582 A1 May 16, 2002

(30) Foreign Application Priority Data

Nov. 14, 2000 (JP) .................................. 2000-346281
Apr. 12, 2001 (JP) .................................. 2001-114421
Aug. 29, 2001 (JP) .................................. 2001-260353

(51) Int. Cl.[7] ........................... H02M 5/45; H02M 7/16
(52) U.S. Cl. ....................................... 363/17; 320/116
(58) Field of Search ............................. 363/17, 19, 20; 320/110, 145, 116, 134, 136, 118; 180/65.4

(56) References Cited

U.S. PATENT DOCUMENTS 5,493,197 A * 2/1996 Eguchi et al. ............... 320/116
6,075,346 A * 6/2000 Kikuchi et al. .............. 320/150

FOREIGN PATENT DOCUMENTS

JP A 5-49101 2/1993
JP A 9-56007 2/1997

* cited by examiner

Primary Examiner—Rajnikant B. Patel
(74) Attorney, Agent, or Firm—Oliff & Berridge, PLC

(57) ABSTRACT

This electric power system controller for an automobile secures satisfactory driving control of a vehicle and outputs 100 V AC using electric power from a secondary battery. The stop of the 100 V AC output is determined by a 100 V AC inverter according to a state of the 100 V AC inverter, a vehicle control system, or an AC plug receptacle 50 or a state represented by the temperature, inter-terminal voltage, and remaining capacity SOC of a battery which exchanges electric power with a driving motor (S100 to S109, S114). Further, a charge discharge state is determined from the charging and discharge current and charge and discharge integration amount and the 100 V AC output is limited by the 100 V AC inverter (S108, S110, S116).

30 Claims, 5 Drawing Sheets

AUTOMOBILE AND ELECTRIC POWER SYSTEM CONTROLLER THEREOF

BACKGROUND OF THE INVENTION

1. Field of the Invention

The present invention relates to an automobile and its electric power system controller, and, more particularly, to an automobile provided with a driving control unit which drives and controls an internal engine or an electric motor as a power source and an electric power system controller which controls an electric power system of an automobile on which a chargeable and dischargeable secondary battery is mounted.

2. Description of the Prior Art

Up to now, an automobile electric power system controller of this type that converts an electric power from a secondary battery which exchanges the power with a generator motor for driving mounted on a hybrid car to the 100 V AC power and supplies it to a plug receptacle (for example, Japanese Patent Laid-Open Publication No. Hei 9-56007) has been proposed. This automobile electric power system controller convert a DC power from the secondary battery to the 100 V AC power by an inverter and supply it to the plug receptacle, and can charge the secondary battery by converting the 100 V AC power from a commercial power supply to the DC power when the plug receptacle is connected to the commercial power supply.

However, in such an automobile electric power system controller, a state of a secondary battery or a state of a vehicle is not considered with regard of the control of an inverter which converts a DC power from the secondary battery to the 100 V AC power, the secondary battery may be over discharged and the driving control of the vehicle may not be performed satisfactorily.

SUMMARY OF THE INVENTION

An object of an automobile electric power system controller of the present invention is to more appropriately limit the conversion of an electric power from a secondary battery to predetermined alternating current power in accordance with a state of the secondary battery. A further object of the electric power system controller of the present invention is to more appropriately restrict the conversion of the electric power from the secondary battery to the predetermined AC power in accordance with a usage state of the predetermined AC power. An object of an automobile of the present invention is to secure satisfactory driving control of a vehicle and then to convert the power from the secondary battery to the predetermined AC power.

A first automobile electric power system controller of the present invention is an electric power system controller which controls an electric power system of an automobile on which a chargeable and dischargeable secondary battery is mounted, and is provided with an electric power converter which converts an electric power from the secondary battery to predetermined AC power, a state detector that detects the state of the secondary battery, and an electric power conversion limiting unit which limits the electric power conversion by the electric power converter according to the detected state of the secondary battery.

In this first automobile power system controller of the present invention, because there is conversion of electric power from the secondary battery to the predetermined AC power by the electric power converter according to the state of the secondary battery, the secondary battery can be kept in a satisfactory state. As a result, the drive of on-board electric equipment that receives the supply of electric power from the secondary battery, and control of this equipment, can be secured.

In this type of first automobile electric power system controller of the present invention, the state detector can also detect at least one of the remaining capacity, temperature, inter-terminal voltage, charging discharge current, and charge discharge integration amount of the secondary battery as the state of the secondary battery.

Further, in the first automobile electric power system controller of the present invention, the electric power conversion limiting unit can also place a limitation on at least one of the power, maximum current, and overheating protection setting temperature for the electric power conversion by the electric power converter.

A second automobile electric power system controller of the present invention is an electric power system controller which controls an electric power system of an automobile on which a chargeable and dischargeable secondary battery is mounted, and is provided with an electric power converter which converts the electric power from the secondary battery to predetermined AC power, a state detector which detects the state of the electric power system from the secondary battery to an AC output end, and an electric power conversion limiting unit which limits the electric power conversion by the electric power converter according to the detected state of the electric power system.

In this second automobile electric power system controller of the present invention, because the conversion of the electric power from the secondary battery to the predetermined AC power by the electric power converter according to the state of the electric power system from the secondary battery to the AC output end, the secondary battery including the AC output end can be kept in a satisfactory state. As a result, the drive of on-board electric equipment that receives the supply of electric power from the secondary battery and its control can be secured.

With the second automobile power system controller of the present invention, the electric power conversion limiting unit can also place a limitation on at least one of the electric power, maximum current, and overheat protection setting temperature with respect to electric power conversion by the electric power converter.

Further, the second automobile electric power system controller of the present invention is provided with an output end error determination unit which determines an error of the AC output end, and the electric power conversion limiting unit can also stop the electric power conversion by the electric power converter when the error of the AC output end is determined by the output end error determination unit. In the second automobile electric power system controller of the present invention of this aspect, the output end error determination unit can also determine the error of the AC output end according to at least one of the inter-terminal voltage, current, phase difference between the inter-terminal voltage and current, and temperature of the AC output end. Further, in the second automobile electric power system controller of the present invention of an aspect in which the output end error decision unit is provided, the error of the AC output end is a short circuit of an output terminal at the AC output end.

Further, the first or second automobile electric power system controller of the present invention is provided with an error determination unit that determines an error of the electric power converter, and the electric power conversion limiting unit can also limit the electric power conversion by the power converter according to a determination result indicating an error in the electric power converter by the error determination unit. In the first or second automobile electric power system controller of the present invention of this aspect, the electric power conversion limiting unit can also stop the electric power conversion by the electric power converter when the error of the power converter is decided by the error decision unit.

Moreover, the first or second automobile electric power system controller of the present invention is provided with an electric power use state detector which detects the usage state of the predetermined AC power, and the electric power conversion limiting unit can also limit the electric power conversion by the electric power converter according to the usage state of the predetermined AC power detected by the electric power use state detector. This can suppress malfunction of electric equipment which uses the predetermined AC power due to the limitation of electric power conversion.

A third automobile electric power system controller of the present invention is an electric power system controller for an automobile on which a chargeable and dischargeable secondary battery is mounted and which can be driven using the electric power from the secondary battery, and is provided with an electric power converter which converts the electric power from the secondary battery to predetermined AC power, a state detector that detects a driving state of the vehicle, and an electric power conversion limiting unit which limits electric power conversion by the electric power converter according to the detected driving state of the automobile.

In this third automobile electric power system controller of the present invention, because the conversion of the electric power converter to the predetermined AC power according to the driving state of an automobile, the driving state of the automobile which can be driven by receiving the supply of the power from a secondary battery can be maintained satisfactorily.

In this third automobile electric power system controller of the present invention, the state detector can also detect motion of the automobile. In the third automobile electric power system controller of the present invention of this aspect, the state detector can also detect a vehicle speed or an operating state of a parking brake.

Further, in the third automobile electric power system controller of the present invention, the electric power conversion limiting unit can also place a limitation on at least one of the electric power, maximum current, and overheating protection setting temperature for power conversion by the electric power converter.

In the first, second or third automobile electric power system controller of the present invention, the predetermined AC power is any power of 100 V AC, 115 V AC, 220 V AC, or 230 V AC.

Further, in the first, second or third automobile electric power system controller of the present invention, the secondary battery can also supply electric power of a higher voltage than an effective value of the predetermined AC power. In the first, second or third automobile electric power system controller of the present invention of this aspect, the automobile is provided with a driving electric motor and the secondary battery can also supply electric power to the electric motor.

An automobile of the present invention is an automobile which is provided with a driving control unit which drives and controls an internal engine and/or an electric motor as a power source, and is provided with the first, second or third automobile electric power system controller of the present invention of any of the aspects, wherein the driving control unit serves the electric power conversion limiting unit as well as controlling the electric power converter.

In this automobile of the present invention, because a driving control unit which drives and controls an internal engine or an electric motor as a power source serves an electric power conversion limiting unit of an electric power system controller as well, the conversion from the electric power from the secondary battery to the predetermined AC power can be controlled by the electric power converter in accordance with a state of the automobile. As a result, the drive of the onboard electric equipment, such as the electric motor, which receives the supply of electric power from the secondary battery, and its control, can be secured more appropriately.

BRIEF DESCRIPTION OF THE DRAWINGS

Preferred embodiments of the present invention will be described in detail based on the following, wherein.

DESCRIPTION OF THE PREFERRED EMBODIMENT

Figure 1:
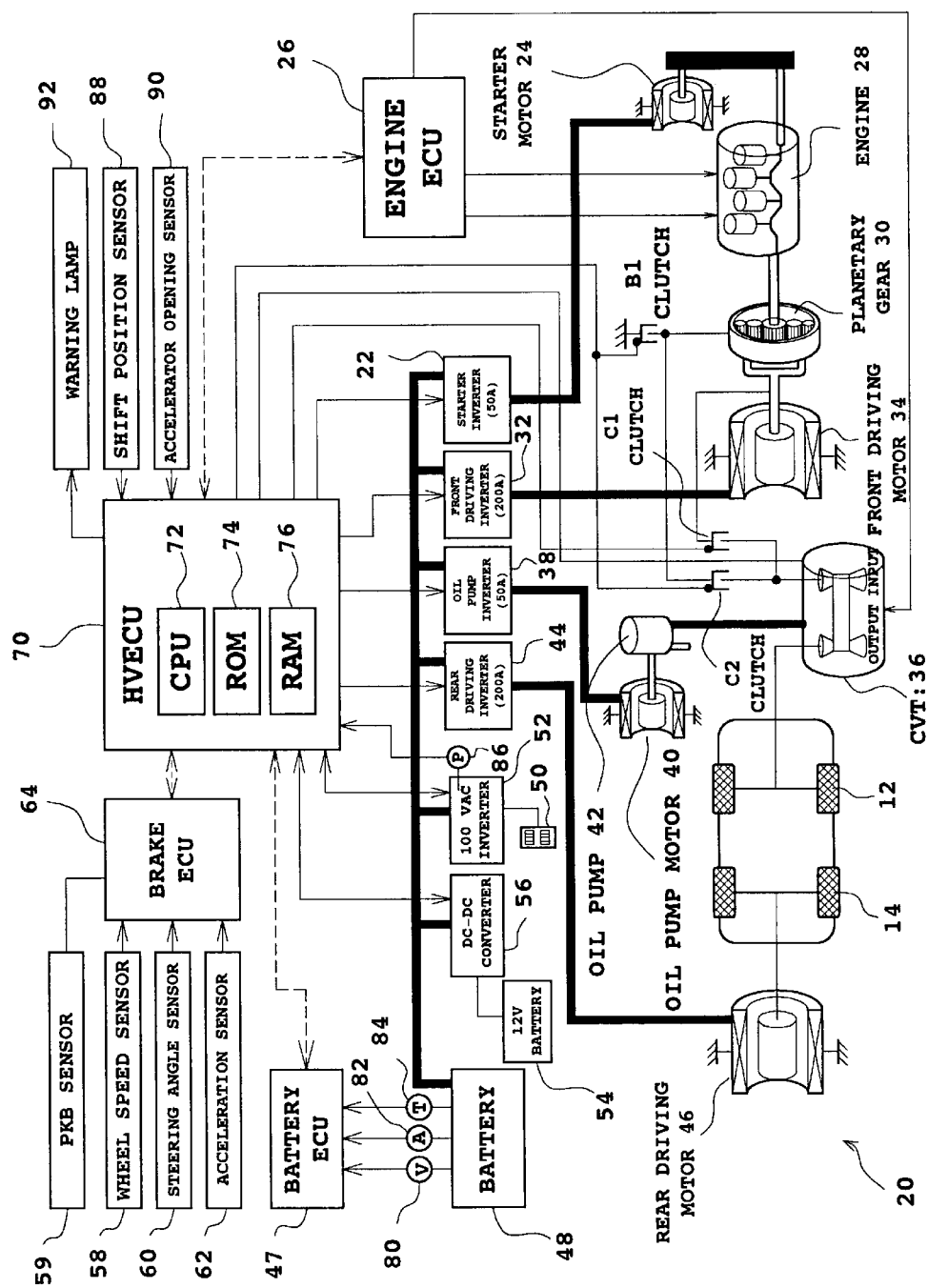
FIG. 1 is a block diagram showing an outline of the configuration of a hybrid car 20 according to an embodiment of the present invention.

Embodiments of the present invention are described below using examples. FIG. 1 is a block diagram showing an outline of a hybrid car 20 which is an embodiment of the present invention. The hybrid car 20 of the embodiment, as shown in the drawing, is provided with an engine 28 which is started by a starter motor 24 driven and controlled by a starter inverter 22 and is operated and controlled by an engine electronic control unit (hereinafter referred to as engine ECU) 26, a front driving motor 34 which is carrier-connected to a planetary gear 30 sun-gear-connected to an output axis of the engine 28 and which is driven and controlled by a front driving inverter 32, a CVT 36 which is connected to the carrier of the planetary gear 30 via a C1 clutch and which is connected to a ring gear via the C1 and a C2 and continuously changes the number of revolutions of an input axis, then outputs it to a rotation axis of a front wheel 12, an oil pump 42 which supplies lubricating oil to the CVT 36 by driving an oil pump motor 40 driven and controlled by an oil pump inverter 38 through its rotary drive, a rear driving motor 46 which is driven and controlled by a rear driving inverter 44 and which outputs torque to the rotation axis of a rear wheel 14, a 100 V AC inverter 52 which converts an electric power of a battery 48 connected to each of the inverters 22, 32, 38, and 44 and managed by a battery electronic control unit (hereinafter referred to as battery ECU) 47 to the 100 V AC power and supplies it to an AC plug receptacle 50, a DC-DC converter 56 which converts the electric power from the battery 48 to low voltage DC power and supplies it to a 12 V battery 54 for driving accessories, a brake electronic control unit (hereinafter referred to as brake ECU) 64 which performs slip control and brake control based on a wheel speed from a wheel speed sensor 58, a steering angle from a steering angle sensor 60, and acceleration from an acceleration sensor 62, and a hybrid electronic control unit (hereinafter referred to as HVECU) 70 that performs overall control of the hybrid car 20.

The battery 48 is constituted as a combined battery in which multiple chargeable and dischargeable cells, such as lithium ion batteries and nickel hydrogen batteries, are connected in series and a higher voltage than 100 V (for example, 200 V or 400 V) is used, and supplies an electric power to the front driving motor 34 and the rear driving motor 46.

The 100 V AC inverter 52 is not shown, but is composed of an inverter circuit which consists of four transistors and four diodes and an inverter control circuit which controls the switching of the four transistors and detects an error of the inverter circuit as main components and converts DC power from the battery 48 to the same 100 V AC power as commercial power.

Figure 2:
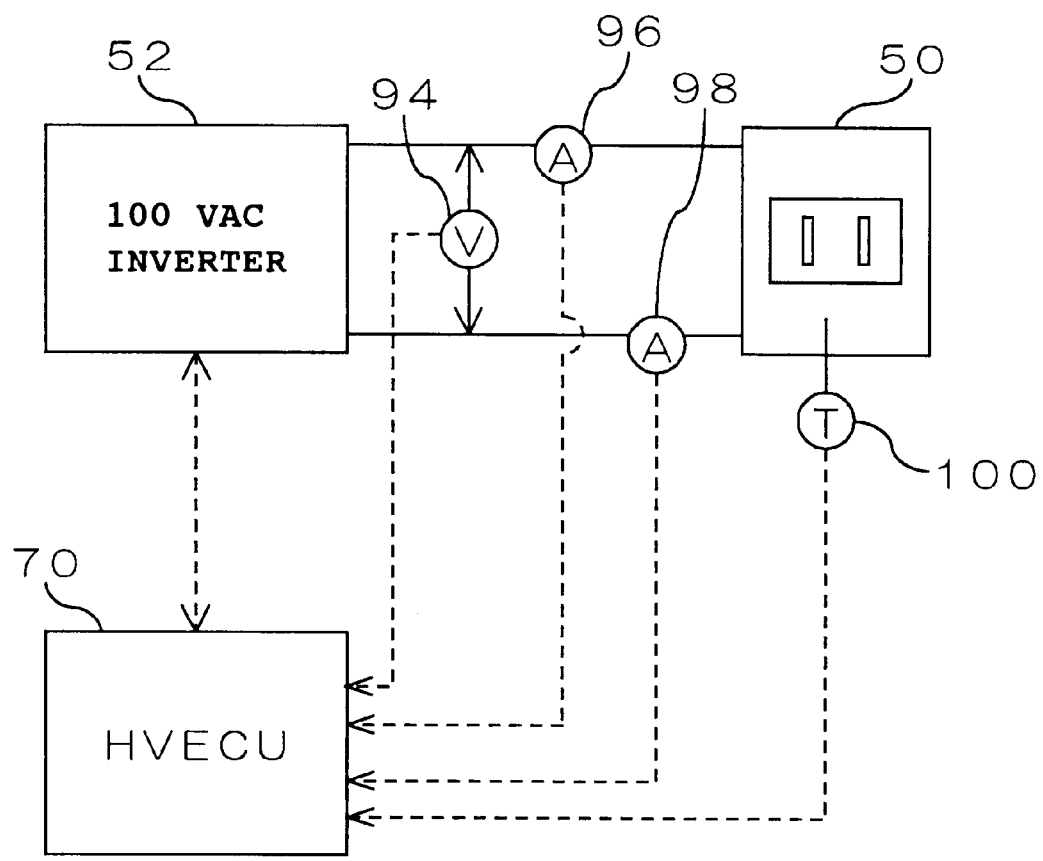
FIG. 2 is a drawing showing an example of a circuit for detecting the state of an AC plug receptacle of the hybrid car 20 of the embodiment.

The HVECU 70 comprises a microprocessor, of which the main part is a CPU 72, and is provided with a ROM 74 that stores a processing program, a RAM 76 that temporarily stores data, an input/output port (not shown), and a communication port (not shown). This HVECU 70 communicates with the engine ECU 26, battery ECU 47, and brake ECU 64 via the communication port and controls the operation of the engine 28 by the engine ECU 26 based on an output instruction which is output to the engine ECU 26. Further, the HVECU 70 can input inter-terminal voltage Vb of the battery 48 detected by a voltmeter 80, a charging discharge current i of the battery 48 detected by an ammeter 82, and a temperature Tb of the battery 48 detected by a temperature sensor 84 from the battery ECU 47 and can input a remaining capacity SOC and a charge discharge integration amount Q operated by the battery ECU 47 from the battery ECU 47 based on the inter-terminal voltage Vb and the charging discharge current i of the battery 48. An error determination signal from the inverter control circuit of the 100 V AC inverter 52, power consumption P of the 100 V AC power detected by a power meter 86, a shift lever position from a shift position sensor 88, and accelerator opening amount from an accelerator opening sensor 90 are input to the input port of the HVECU 70. Further, as shown in FIG. 2, voltage Vo between the output terminals of the AC plug receptacle 50 as an output end of the 100 V AC power detected by a voltmeter 94, a current Io that flows into each output terminal of the AC plug receptacle 50 detected by ammeters 96, 98, and a temperature To (temperature of an output terminal and wiring) of the AC plug receptacle 50 detected by a temperature sensor 100 are also input to the input port of the HVECU 70. A control signal into the inverter control circuit of the 100 V AC inverter 52 and a lighting signal into a warning lamp 92 are output from the output port of the HVECU 70.

Besides, the engine ECU 26, battery ECU 47, and brake ECU 64 are not shown, but they are constituted as a microprocessor, the main part of which is a CPU, in the same manner as the HVECU 70.

Figure 3:
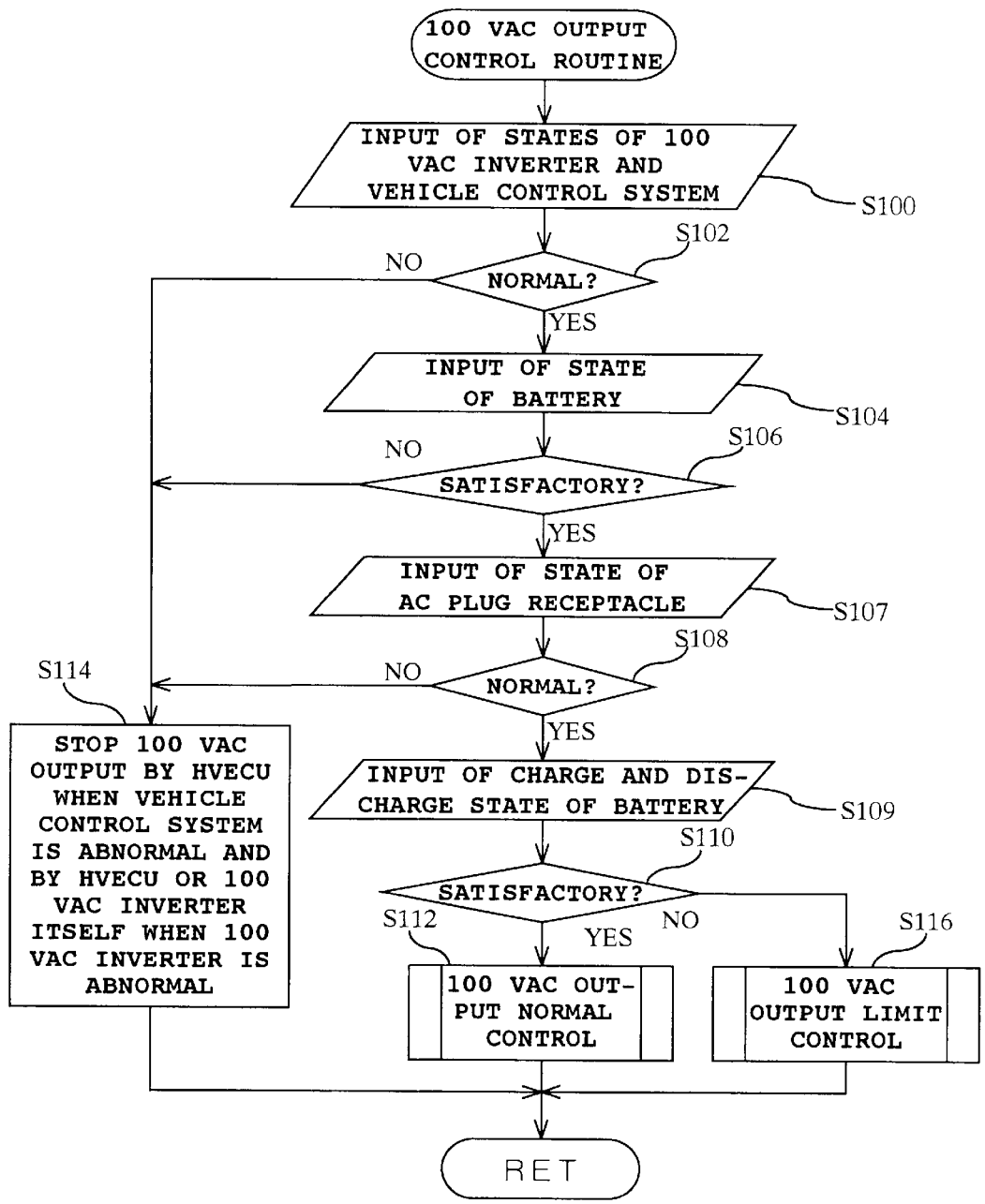
FIG. 3 is a flowchart showing an example of a 100 V AC output limit control routine executed by an HVECU 70 of the hybrid car 20 of the embodiment.

Next, the control of the hybrid car 20 of such a constituted embodiment, in particular, the output control of the 100 V AC power, will be described. FIG. 3 is a flowchart showing an example of a 100 V AC output control routine executed by the HVECU 70 of the hybrid car 20 of the embodiment. This routine is repetitively executed every predetermined time when an electric power conversion start instruction is issued.

When the 100 V AC output control routine is executed, the CPU 72 of the HVECU 70 of the embodiment first inputs a state of the 100 V AC inverter 52 or a vehicle control system (step S100) and determines whether the 100 V AC inverter 52 or the vehicle control system is normal or not (step S102). The input of the state of the 100 V AC inverter 52 is specifically the input of an error determination signal from an inverter control circuit of the 100 V AC inverter 52 and the input of the state of the vehicle control system is the input of control state of each equipment by the communication with the engine ECU 26, the battery ECU 47 or the brake ECU 64, and the input of a signal that is directly input from each item of equipment to the HVECU 70. When the 100 V AC inverter 52 and the vehicle control system are determined as normal, the state of the battery 48 is input (step S104) and whether the state of the battery 48 is satisfactory or not is determined (step S106). The state of the battery 48, for example, corresponds to the temperature Tb, inter-terminal voltage Vb, or remaining capacity SOC of the battery 48. The state of the battery 48 is determined, for example, according to whether the temperature Tb of the battery 48 is within the satisfactory temperature range which is set using a threshold T1 and a threshold T2, whether the remaining capacity SOC is within the satisfactory SOC range exceeding a threshold S1, or whether the inter-terminal voltage Vb is within the satisfactory voltage range exceeding a threshold Vr. Besides, in the embodiment, the satisfactory temperature range of the temperature Tb of the battery 48, the satisfactory SOC range of the remaining capacity SOC, or the satisfactory voltage range of the inter-terminal voltage Vb is set as a range where the starter motor 24, front driving motor 34, and the rear driving motor 46 can be satisfactorily driven and controlled by the electric power from the battery 48.

When the state of the battery 48 is determined as satisfactory, the state of the AC plug receptacle 50 is input (step S107) and whether the state of the AC plug receptacle 50 is normal or not is determined (step S108). The state of the AC plug receptacle, for example, corresponds to the voltage Vo between the output terminals from the voltmeter 94, current Io which flows into each output terminal from the ammeters 96, 98, a phase difference between the voltage Vo and current io, and the temperature To from the temperature sensor 100. Besides, only either the ammeter 96 or 98 ought also be provided. Whether the state of the AC plug receptacle 50 is normal or not is determined, for example, according to whether an effective value of the voltage Vo between the output terminals is within the normal voltage range exceeding a threshold Vor, whether an effective value of the current Io which flows into each output terminals is within the normal current range below a threshold Ior, whether the rise temperature Δ To (rise temperature at a predetermined time) of the temperature To of the AC plug receptacle 50 is within the normal rise temperature range below a threshold ΔTor, or whether the phase difference ø between the voltage Vo and the current Io is within the normal phase difference range exceeding a threshold ør. When one or multiple items among these items (the effective value of the voltage Vo, the effective value of the current Io, the phase difference ø, and the rise temperature ΔTo) are not within the normal range, an error is judged. This is based on the fact that when a short circuit occurs between the output terminals of the AC plug receptacle 50 as an error of the AC plug receptacle 50, the effective value of the inter-terminal voltage Vo detected by the voltmeter 94 is decreased and the effective value of the current Io detected by the ammeters 96, 98 is increased, then the rise temperature ΔTo of the temperature To detected by the thermometer (temperature sensor) 100 is increased. This is also based on the fact that when a short circuit occurs in a capacitor or a reactor which constitutes a noise filter for removing noise (high frequency components) of the 100 V AC voltage supplied to the AC plug receptacle 50, the phase difference between the voltage Vo and the current Io is decreased. Besides, specific values of the threshold Vor, threshold Ior, threshold Tor, and threshold ø are set as values at which the use of electric equipment connected to the AC plug receptacle 50 may become unsafe due to a fault of the AC plug receptacle 50 and a defect may occur in the operation of a vehicle control system. Further, the phase difference between the voltage Vo and current Io is calculated by comparing the current Io and voltage Vo converted to a PWM waveform, for example, after the current Io is converted to the same PWM waveform as the voltage Vo.

When the state of the AC plug receptacle 50 is determined as normal, a charge discharge state of the battery 48 is input (step S109) and whether the charge discharge state of the battery 48 is satisfactory or not is determined (step S110). The charge discharged state of the battery 48 corresponds to a charging discharge current i and a charge discharge integration amount Q. The charge discharge state of the battery 48 is determined according to whether the charging discharge current i is within the satisfactory current range which is set using a threshold i1 and a threshold i2 and the charge discharge amount Q is within the satisfactory current range exceeding the threshold Qr. In the embodiment, the satisfactory current range of the charging discharge current i and the satisfactory integration amount range of the charge discharge amount Q are set as the range where the starter motor 24, front driving motor 34, and the rear driving motor 46 can be satisfactorily driven and controlled by the electric power from the battery 48.

When the charge discharge state of the battery 48 is judged to be satisfactory, the CPU 72 outputs a control signal indicating that normal control of output is performed by the 100 V AC inverter 52 to the inverter control circuit of the 100 V AC inverter 52 (step S112) and this routine is terminated. Accordingly, the 100 V AC power is supplied to the AC plug receptacle 50 and the electric equipment connected to the AC plug receptacle 50 can be operated.

When the state of the 100 V AC inverter 52 or a vehicle control system is judged to be abnormal instep S102, the state of the battery 48 is judged to be unsatisfactory in step 106, or the state of the battery 48 is judged to be abnormal in step S108, the electric power conversion by the 100 V AC inverter 52 is stopped (step S114) by the HVECU 70 if an error occurs in the vehicle control system or by the HVECU 70 or the 100 V AC inverter 52 itself if an error occurs in the 100 V AC inverter 52, and this routine is terminated. Accordingly, the electric power conversion when the 100 V AC inverter 52, vehicle control system and AC plug receptacle 50 are abnormal and the discharge when the battery 48 is not in a satisfactory state can be prevented.

When the charge discharge state of the battery 48 is not judged to be satisfactory instep S110, the 100 V AC output limit processing which limits the 100 V AC output is executed (step S116) and this routine is terminated. The 100 V AC output limit processing is executed by the 100 V AC output limit control routine illustrated in FIG. 4, for example. The 100 V AC output limit processing reads the power consumption P of the electric equipment connected to the AC plug receptacle 50 that is detected by the power meter 86 (step S120) and sets a limit level based on the read power consumption P (step S122), then limits the 100 V AC output based on the set limit level (step S124). The limit level is set so that the limit level can be increased as the power consumption P is increased, for example. The 100 V AC output is limited by setting the supply power on a small scale, setting the maximum current low or setting the overheating protection setting temperature low.

According to the hybrid car 20 of the embodiment described above, because the 100 V AC output is stopped by the 100 V AC inverter 52 based on the state of the 100 V AC inverter 52 or a vehicle control system, the electric power conversion when the 100 V AC inverter 52 or the vehicle control system is abnormal can be prevented. Further, according to the hybrid car 20 of the embodiment, because the 100 V AC output is stopped when an error occurs in the AC plug receptacle 50, the electric power conversion when the AC plug receptacle 50 is abnormal can be prevented and the safety when the electric equipment connected to the AC plug receptacle 50 is used can be secured. Moreover, according to the hybrid car 20 of the embodiment, because the 100 V AC output is stopped by the 100 V AC inverter 52 based on the state of the battery 48, the over discharge of the battery 48 or the discharge in an abnormal state can be prevented. Besides, because the satisfactory temperature range of the temperature Tb of the battery 48, the satisfactory SOC range of the remaining capacity SOC or the satisfactory voltage range of the inter-terminal voltage Vb is set as a range where the starter motor 24, front driving motor 34, and rear driving motor 46 can be satisfactorily driven and controlled by the electric power from the battery 48, the driving control of the hybrid car 20 will not be damaged. Further, according to the hybrid car 20 of the embodiment, because the limit of the 100 V AC output is determined based on the charge discharge state of the battery 48 and the 100 V AC output is limited based on the power consumption P of the electric equipment connected to the AC plug receptacle 50, the driving control of the hybrid car 20 will not be damaged and the electric power required for the electric equipment can be converted by the 100 V AC inverter 52.

Further, in the hybrid car 20 of the embodiment, because the control of the electric power conversion of the 100 V AC inverter 52, in particular, an output limit or stop, is performed by the HVECU 70 which performs overall control of the hybrid car 20, the satisfactory driving control of the hybrid car 20 is secured and then the 100 V AC output can be performed.

In the hybrid car 20 of the embodiment, when the charge discharge state of the battery 48 is not satisfactory, the 100 V AC output is limited by setting a limit level based on the power consumption P of the electrical equipment connected to the AC plug receptacle 50, but it may be uniformly limited regardless of the power consumption P of the electric equipment connected to the AC plug receptacle 50. Further, in the hybrid car 20 of the embodiment, when the charge discharge state of the battery 48 is not satisfactory, the 100 V AC output is limited, but it is also possible to stop the 100 V AC output.

The embodiment is described as the limit or stop control when the 100 V AC is output using the electric power from the battery 48 which exchanges the electric power with the front driving motor 34 and the rear driving motor 46 in a hybrid car which is driven by a power from the engine 28, a power from the front driving motor 34, and a power from the rear driving motor 46. However, it can also be applied to the limit and stop control when the 100 V AC is output using the electric power from a chargeable and dischargeable battery mounted on an automobile provided with either an engine or a motor as a power source, as well as to a hybrid powered vehicle.

Figure 5:
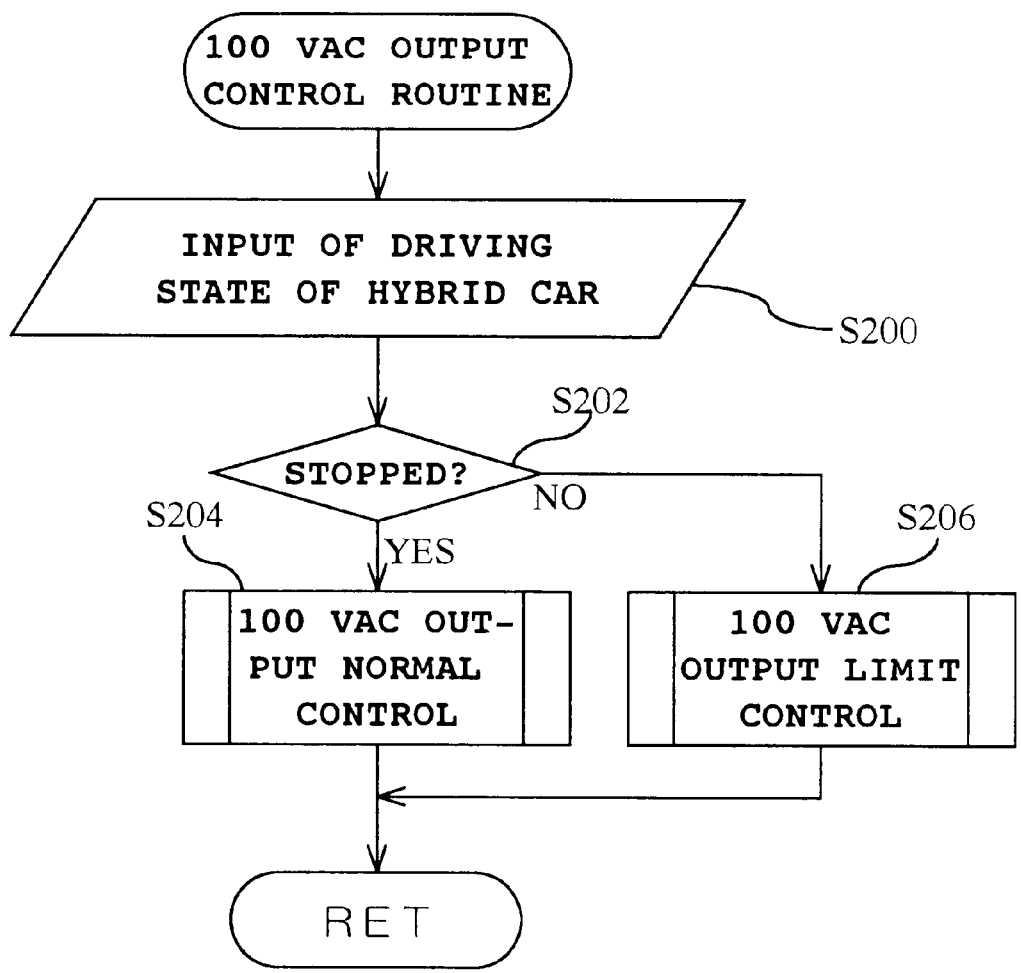
FIG. 5 is a flowchart showing an example of the 100 V AC output control routine executed by the HVECU 70 of a hybrid car 120 of a second embodiment.

Next, a hybrid car 120 according to a second embodiment of the present invention will be described. The hybrid car 120 of the second embodiment has the same configuration as the hybrid car 20 of the first embodiment except that the control of the 100 V ACV AC output differs in the HVECU 70. Accordingly, the same symbols are affixed to the same parts of the hybrid car 20 of the first embodiment and its description is omitted. FIG. 5 is a flowchart showing an example of a 100 V AC output control routine executed by the HVECU 70 of the hybrid car 120 of the second embodiment. This routine is repeatedly executed every predetermined time when a power conversion start instruction is issued.

Figure 4:
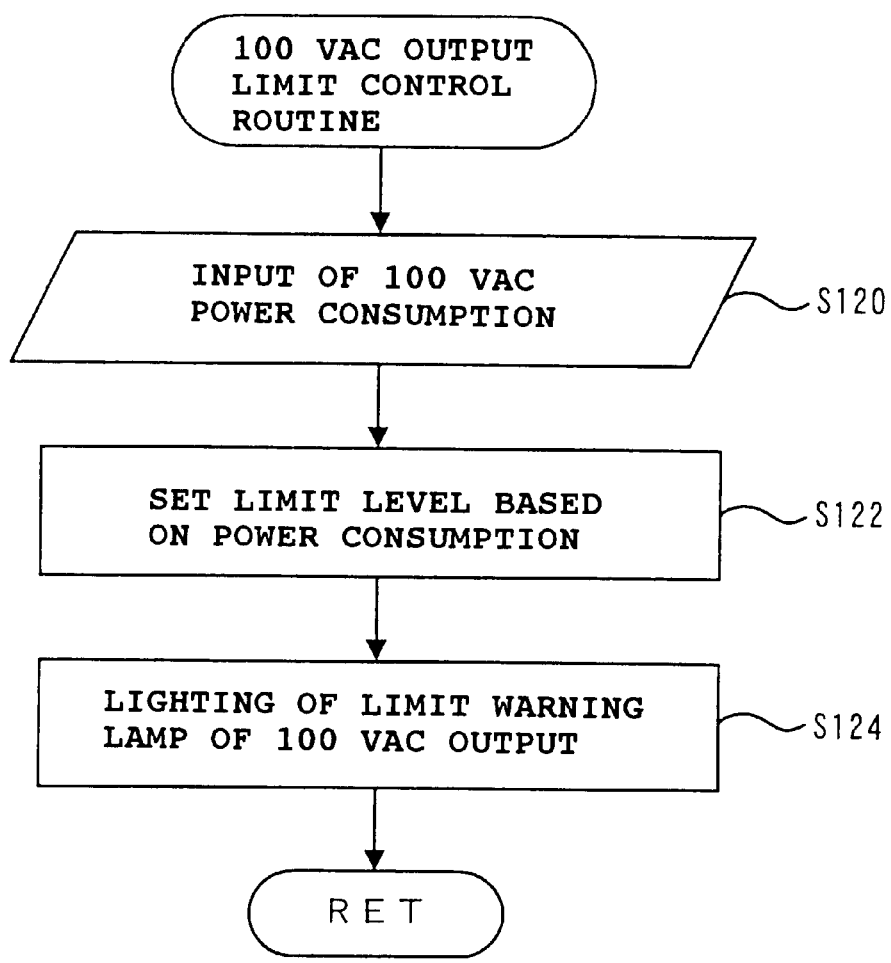
FIG. 4 is a flowchart showing another example of the 100 V AC output control routine executed by the HVECU 70 of the hybrid car 20 of the embodiment.

When the 100 V AC output control routine is executed, the CPU 72 of the HVECU 70 first inputs the driving state of the hybrid car 120, that is, a vehicle (step S200) and decides whether a wheel is stopped or not (step S202). The driving state of the wheel is input, for example, by inputting a wheel speed from the wheel speed sensor 58 and a state signal from a PKB sensor 59 which detects an operating state of a parking brake (PKB). As a result of decision, when the wheel is judged as being stopped (for example, when the wheel speed is zero or the parking brake is operating), the CPU 72 outputs a control signal indicating that normal control of output is performed by the 100 V AC inverter 52 to the inverter control circuit of the 100 V AC inverter 52 (step S204) and this routine is terminated. Accordingly, the 100 V AC power is supplied to the AC plug receptacle 50 and the electric equipment connected to the AC plug receptacle 50 can be operated. On the other hand, when a vehicle is judged as being in motion, the 100 V AC output limit processing which limits the 100 V AC output is executed (step S206) and this routine is terminated. The 100 V AC output control processing is executed by the same processing as the routine of FIG. 4 shown previously, for example. Thereupon, limiting the 100 V AC output when the vehicle is running is based on the fact that the electric power required for the drive of the front driving motor 34 and the rear driving motor 46 may not be able to be secured from the battery 48 if the 100 V AC inverter 52 performs normal output while the vehicle is running during which period a large amount of the storage power of the battery 48 may be consumed.

According to the hybrid car 120 of the second embodiment described above, because the 100 V AC output is limited based on the driving state of the hybrid car 120, the excess electric power conversion of the 100 V AC inverter 52 is prevented while a vehicle is running during which period a large amount of the electric power of the battery 48 may be consumed and the electric power required for the drive of the front driving motor 34 and the rear driving motor 46 can be secured. As a result, the driving performance of the vehicle be optimized. Further, because the power conversion control of the 100 V AC inverter 52, in particular, an output limit is performed by the HVECU 70 which controls the entirety of the hybrid car 120, the satisfactory driving control of the hybrid car 120 is secured and then the 100 V AC output can be performed.

In the hybrid car 120 of the second embodiment, when a vehicle is running, the output of the 100 V AC inverter 52 is limited, but it is also possible to limit the output of the 100 V AC inverter 52 in another driving state of the vehicle, for example, when a large amount of power is estimated to be consumed from the battery 48, such as when the vehicle is climbing a slope or when the vehicle is accelerating faster than a specified rate.

In the hybrid car 120 of the second embodiment, the embodiment is described as a limit when the 100 V AC is output using the electric power from the battery 48 which exchanges the electric power with the front driving motor 34 and the rear driving motor 46 in a hybrid car which is driven by a power from the engine 28, a power from the front driving motor 34 and a power from the rear driving motor 46. However, it can also be applied to the limit when the 100 V AC is output using the electric power from a chargeable and dischargeable battery mounted in another hybrid car provided with an engine and a motor as a power source or a vehicle provided with a motor as the power source.

While there have been described what are at present considered to be preferred embodiments of the invention, it is to be understood that various modifications may be made thereto, and it is intended that the appended claims cover all such modifications as fall within the true spirit and scope of the invention.

What is claimed is:

1. An electric power system controller which controls an electric power system of an automobile on which a chargeable and dischargeable secondary battery is mounted, comprising:
    an electric power converter which converts an electric power from the secondary battery to predetermined AC power;
    a state detector which detects a state of the secondary battery; and
    an electric power conversion limiting unit which limits electric power conversion by the electric power converter according to the detected state of the secondary battery.

2. The electric power system controller according to claim 1, wherein
    the state detector detects at least one of remaining capacity, temperature, inter-terminal voltage, charging discharge current, and charge discharge integration amount of the secondary battery as the state of the secondary battery.

3. The electric power system controller according to claim 1, wherein
    the electric power conversion limiting unit places a limitation on at least one of electric power, maximum current, and overheating protection setting temperature with respect to electric power conversion by the power converter.

4. The electric power system controller according to claim 1, further comprising an error determining unit which determines an error of the electric power converter, wherein
    the electric power conversion limiting unit limits the electric power conversion by the electric power converter according to a determination result of the error of the electric power converter by the error determination unit.

5. The electric power system controller according to claim 4, wherein
    the electric power conversion limiting unit stops the electric power conversion by the electric power converter when an error in the electric power converter is determined by the error determination unit.

6. The electric power system controller according to claim 1, further comprising an electric power use state detector which detects a use state of the predetermined AC power, wherein the electric power conversion limiting unit limits the electric power conversion by the electric power converter according to the use state of the predetermined AC power.

7. The electric power system controller according to claim 1, wherein the predetermined AC power is any of 100 V AC, 115 V AC, 220 V AC, and 230 V AC.

8. The electric power system controller according to claim 1, wherein the secondary battery can supply electric power of a higher voltage than an effective value of the predetermined AC power.

9. The electric power system controller according to claim 1, wherein the automobile comprises a driving electric motor, and the secondary battery supplies electric power to the driving electric motor.

10. An electric power system controller which controls an electric power system of an automobile on which a chargeable and dischargeable secondary battery is mounted, comprising:

an electric power converter which converts electric power from the secondary battery to predetermined AC power;

a state detector which detects a state of the power system from the secondary battery to an AC output end; and an electric power conversion limiting unit which limits the electric power conversion by the power converter according to the detected state of the electric power system.

11. The automobile electric power converter according to claim 10, wherein the electric power conversion limiting unit places a limitation on at least one of the electric power, maximum current, and overheating protection setting temperature for the electric power conversion by the electric power converter.

12. The electric power system controller according to claim 10, further comprising an output end error determination unit which determines an error of the AC output end, wherein the electric power conversion limiting unit stops the electric power conversion by the electric power converter when the error of the AC output end is determined by the output end error determination unit.

13. The electric power system controller according to claim 12, wherein the output end error determination unit determines the error of the AC output end according to at least one of the inter-terminal voltage, current, phase difference between the inter-terminal voltage and current, and temperature of the AC output end.

14. The electric power system controller according to claim 12, wherein the error of the AC output end is a short circuit between the output terminals at the AC output end.

15. The electric power system controller according to claim 10, further comprising an error determining unit which determines an error of the electric power converter, wherein the electric power conversion limitation unit limits the electric power conversion by the electric power converter according to a determination result indicating an error in the electric power converter by the error determination unit.

16. The electric power system controller according to claim 15, wherein the electric power conversion limiting unit stops the electric power conversion by the electric power converter when an error in the electric power converter is determined by the error determination unit.

17. The electric power system controller according to claim 10, further comprising an electric power use state detector which detects a use state of the predetermined AC power, wherein the electric power conversion limiting unit limits the electric power conversion by the electric power converter according to the use state of the predetermined AC power detected by the electric power use detector.

18. The electric power system controller according to claim 10, wherein the predetermined AC power is any of 100 V AC, 115 V AC, 220 V AC, and 230 V AC.

19. The electric power system controller according to claim 10, wherein the secondary battery can supply the electric power of a higher voltage than an effective value of the predetermined AC power.

20. The electric power system controller according to claim 10, wherein the automobile is provided with a driving electric motor, and the secondary battery supplies electric power to the driving electric motor.

21. An electric power system controller that controls an electric power system of an automobile on which a chargeable and dischargeable secondary battery is mounted and which can be driven using the electric power from the secondary battery, comprising:

an electric power converter which converts electric power from the secondary battery to predetermined AC power;

a state detector which detects a driving state of the automobile; and an electric power conversion limiting unit which limits electric power conversion by the electric power converter according to the detected driving state.

22. The electric power system controller according to claim 21, wherein the state detector detects motion of the automobile.

23. The electric power system controller according to claim 22, wherein the state detector detects a vehicle speed or an operating state of a parking brake.

24. The electric power system controller according to claim 21, wherein the electric power conversion limiting unit places a limitation on at least one of the electric power, maximum current, and overheating protection setting temperature with respect to the electric power conversion by the electric power converter.

25. The electric power system controller according to claim 21, wherein the predetermined AC power is any of 100 V AC, 114 V AC, 220 V AC, and 230 V AC.

26. The electric power system controller according to claim 21, wherein the secondary battery can supply electric power of a higher voltage than an effective value of the predetermined AC power.

27. The electric power system controller according to claim 21, wherein
the automobile comprises a driving electric motor, and the secondary battery supplies electric power to the driving electric motor.

28. An automobile provided with a driving control unit which drives and controls an internal engine and/or an electric motor as a power source, and
an electric power system controller which controls a power system of the automobile on which a chargeable and dischargeable secondary battery is mounted, comprising:
an electric power converter which converts electric power from the secondary battery to predetermined AC power;
a state detector which detects a state of the secondary battery; and
an electric power conversion limiting unit which limits electric power conversion by the power converter according to the detected state of the secondary battery, wherein the driving control unit serves the electric power conversion limiting unit as well as controlling the electric power converter.

29. An automobile provided with a driving control unit which drives and controls an internal engine and/or an electric motor as a power source, and
an electric power system controller which controls an electric power system of the vehicle on which a chargeable and dischargeable secondary battery is mounted, comprising:
an electric power converter which converts electric power from the secondary battery to predetermined AC power;
a state detector which detects a state of the electric power system from the secondary battery to an AC output end; and
an electric power conversion limiting unit which limits the electric power conversion by the electric power converter according to the detected state of the secondary battery, wherein the driving control unit serves the electric power conversion limiting unit as well as controlling the electric power converter.

30. An automobile provided with a driving control unit which drives and controls an internal engine and/or an electric motor as a power source, and
an electric power system controller which controls an electric power system of the automobile on which a chargeable and dischargeable secondary battery is mounted and which can be driven using the electric power from the secondary battery, comprising:
an electric power converter which converts electric power from the secondary battery to predetermined AC power;
a state detector which detects a driving state of the automobile; and
an electric power conversion limiting unit which limits the electric power conversion by the electric power converter according to the detected driving state, wherein
the driving control unit serves the electric power conversion limiting unit as well as controlling the electric power converter.

* * * * *